United States Patent [19]

Cook

[11] 3,998,784

[45] Dec. 21, 1976

[54] COMPOSITIONS STABILIZED WITH PIPERIDINE DERIVATIVES

[75] Inventor: Barry Cook, Manchester, England

[73] Assignee: Ciba-Geigy Corporation, Ardsley, N.Y.

[22] Filed: Oct. 20, 1975

[21] Appl. No.: 623,835

Related U.S. Application Data

[62] Division of Ser. No. 380,043, July 17, 1973, Pat. No. 3,929,804.

[30] Foreign Application Priority Data

July 28, 1972 United Kingdom ............. 35488/72

[52] U.S. Cl. ................. 260/45.75 N; 260/45.75 M; 260/45.75 P; 260/45.8 N
[51] Int. Cl.$^2$ ....................... C08K 5/34; C08K 5/36
[58] Field of Search ............ 260/45.75 M, 45.75 N, 260/45.75 P, 45.8 N

[56] References Cited

UNITED STATES PATENTS

| | | | |
|---|---|---|---|
| 3,850,877 | 11/1974 | Cook | 260/45.8 |
| 3,883,477 | 5/1975 | Stephen | 260/45.8 |
| 3,920,661 | 11/1975 | Ramey et al. | 260/270 |
| 3,937,711 | 2/1976 | Cook | 260/293.86 |
| 3,939,163 | 2/1976 | Ramey et al. | 260/270 |
| 3,939,168 | 2/1976 | Cook | 260/293.77 |

*Primary Examiner*—Donald E. Czaja
*Assistant Examiner*—R. A. White
*Attorney, Agent, or Firm*—Nestor W. Shust

[57] ABSTRACT

New piperidine derivatives and in particular esters and amides of substituted (piperidinyl-4) acetic acid are used as stabilizers for polymers, especially for polyolefines.

13 Claims, No Drawings

COMPOSITIONS STABILIZED WITH PIPERIDINE DERIVATIVES

This is a divisional of application Ser. No. 380,043, filed on July 17, 1973 now U.S. Pat. No. 3,929,804.

In British Patent Specification No. 1,214,426 there is described the compound having the formula:

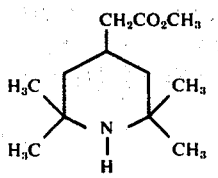

This compound is disclosed as a starting-material for the production of 2,2,6,6-tetramethyl quinuolidine which is said to be pharmacologically active.

A Russian publication Khim, Pharm, ZH, 1970, 4, (10), pages 16 to 21 describes compounds having the formula:

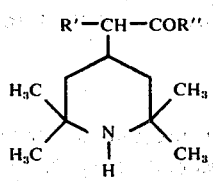

wherein a. R' is $CH_3$ and R'' is $OCH_3$ b. R' is $C_2H_5$ and R'' is $OCH_3$ c. R' is $C_2H_5$ and R'' is $NH_2$ or d. R' is hydrogen and R'' is

Again the only utility for these compounds which is suggested in this paper is their use as intermediates for pharmacologically active quinuclidines.

We have now found that certain novel compounds related to those described above have utility in a totally different field viz. in the stabiliation of polymeric material against the effects of exposure to light.

Accordingly, the present invention provides a compound having the formula:

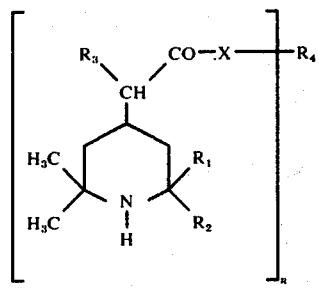

wherein $R_1$ and $R_2$ are the same or different and each is a straight- or branched alkyl residue having from 1 to 12 carbon atoms, or $R_1$ and $R_2$, together with the carbon atom to which they are attached form a cycloalkyl group having from 5 to 12 carbon atoms; $R_3$ is hydrogen, a straight- or branched alkyl residue having from 1 to 4 carbon atoms, an aralkyl residue having from 7 to 9 carbon atoms or a cycloalkyl group having 5 or 6 carbon atoms; $R_4$ is a metal ion or a hydrocarbyl residue having from 2 to 20 carbon atoms and being either unsubstituted or substituted by halogen or interrupted by one or more oxygen or sulphur atoms; X is —O—, —S—, or > $NR_5$, wherein $R_5$ has the same significance as $R_3$; and n is 2, 3 or 4; as well as salts of the amine function of the compounds of formula I.

When n is 2, $R_4$ may be a divalent, straight- or branched aliphatic residue (either saturated or unsaturated) having from 2 to 20 carbon atoms, a divalent alicyclic residue having from 5 to 20 carbon atoms, a divalent aralkyl residue having 8 to 20 carbon atoms, or a divalent aryl residue having 6 to 20 carbon atoms.

Examples of the group $R_4$ when n is 2 are 1,2-ethylene, 1,2-propylene, 1,4-n-butylene, 1,3-butylene, 1,6-n-hexylene, 1,7-n-heptylene, 1,10-n-decylene, 1,12-n-dodecylene, 2,2-dimethyl-1,3-propylene, 1,2,3-trimethyl-1,4-butylene, 3-thia-1,5-pentylene, 3-oxa-1,5-pentylene, 1,4-but--2-enylene, 1,4-but-2-ynylene, 2,5-hex-3-enylene, 1,2-cyclohexylene, 1,3-cyclohexylene, 1,4-cyclohexylene, hexahydro-p-xylylene, p-xylylene, m-xylylene, 1,2-phenylene, 1,4-phenylene, 2,2'-biphenylene, 4,4'-biphenylene, 2,6-naphthylene and 2,7-fluoroenylene.

When n is 3, $R_4$ may be a trivalent straight- or branched chain aliphatic (either saturated or unsaturated) residue having 3 to 15 carbon atoms, a trivalent alicyclic residue having 5 to 15 carbon atoms, a trivalent aralkyl residue having from 9 to 15 carbon atoms, or a trivalent aryl residue having 6 to 16 carbon atoms.

Examples of the group $R_4$ when n is 3 are 1,2,3-trisubstituted propane, 1,2,4-tri substituted butane, 2,5-dimethyl-1,2,6-tri substituted hexane, 1,1,1-trimethylene-propane, 1,2,3-tri-substituted cyclohexane, 1,3,5-tri-substituted cyclohexane, 1,3,5-trimethylenebenzene and 1,2,7-trisubstituted anthracene.

When n is 4, $R_4$ may be a straight- or branched chain tetravalent aliphatic residue (either saturated or unsaturated) having 4 to 12 carbon atoms or a tetravelent alicyclic residue having from 5 to 12 carbon atoms, such as tetramethylenemethane or 1,1,4,4-tetramethylene cyclohexane.

When n is 2, 3 or 4 and $R_4$ is an aliphatic or alicyclic residue each of these residues may be unsubstituted or substituted by halogen or interrupted by one or more oxygen or sulphur atoms or an aryl or aralykyl residue.

When $R^4$ is a metal ion, it is preferably a transitional metal ion, more preferably an ion of a metal of Group VIII of the Periodic System of Elements and especially an ion of nickel.

Examples of the groups $R_1$ and $R_2$ are methyl, ethyl, n-propyl, isopropyl, n-butyl, sec-butyl, n-hexyl, n-dodecyl, or together with the carbon to which they are bound $R_1$ and $R_2$ can form a group such as:

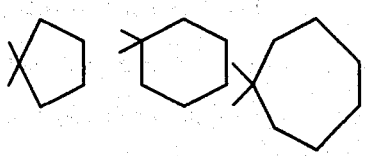

-continued

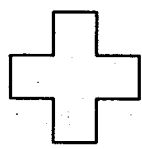 

Particularly preferred substituents $R_1$ and $R_2$ are straight or branched alkyl groups having 1 to 4 carbon atoms and the most preferred value for each of $R_1$ and $R_2$ is methyl.

Examples of the groups $R_3$ and $R_5$ are hydrogen, methyl, ethyl, n-propyl, isopropyl, n-butyl, sec-butyl, benzyl, α-methylbenzyl, α,p-dimethylbenzyl, cyclohexyl, cyclopentyl. Particularly preferred substituents $R_3$ and $R_5$ are hydrogen and alkyl having 1 to 4 carbon atoms and the most preferred is hydrogen.

Examples of salts of the compounds of formula I that can be used according to the invention include salts of an inorganic acid, such as phosphates, carbonates, sulphates, chlorides and the like, as well as organic acid salts such as acetates, stearates, maleates, citrates, tartrates, oxalates, benzoates and substituted carbamic acids.

Examples of the esters and amides of formula 1 are given in the following list:

1,2-ethylene-di[(2',2',6',6',-tetramethylpiperidinyl-4')acetate]
1,4-butylene-di[(2',2',6',6',-tetramethylpiperidinyl-4')acetate]
1,10-decylene-di[(2',2',6',6',-tetramethylpiperidinyl-4')acetate]
1,4-But-2-enylene[(2,2,6,6-tetramethylpiperidinyl-4')acetate]
3-thia-1,5-pentylene-di[(2'-di-t-butyl-,6',6',-tetramethylpiperidinyl-4')acetate]
3-oxa-1,5-pentylene-di[(2',2',6',6',tetramethylpiperidinyl-4')acetate]
1,4-butylene-di[(2',2',6',6',tetramethylpiperidinyl-4')-thioacetate]
1,1,1-tris[(2',2',6',6'-tetramethylpiperidinyl-4')acetoxyymethyl]-propane
Tetrakis[(2',2',6',6',-tetramethylpiperidinyl-4)acetoxymethyl]-methane
N,N'-Di[(2',2',6',6'-tetramethylpiperidinyl-4')acetyl]ethane-1,2-diamine.
N,N'-di[(2',2',6',6'-tetramethylpiperidinyl-4')acetyl]-hexane-1,6-diamine.
N,N'-di[(2',2',6',6'-tetramethylpiperidinyl-4')acetyl]octane-1,8-diamine.
N,N'-di[(2', 2',6'-tetramethylpiperidinyl-4')acetyl]-phenyl-1,4-diamine.
1,1,4,4-tetrakis[(2',2',6',6',-tetramethylpiperidinyl-4')acetoxymethyl]-cyclohexane.
1,2-ethylene-di(2',2'-di-isopropyl-6,6-dimethyl-piperidinyl-4')-acetate
N,N'-di[(2'-ethyl-2'-n-propyl-6', 6',-dimethylpiperidinyl-4')acetyl]butane-1,4-diamine.
1,2-ethylene-di[(1'aza-2',2'-dimethylapiro(5',-5']undecyl-4')acetate]
1,3-butylene-di[(2',2',6',6'-tetramethylpiperidinyl-4')acetate]
2,2,4-trimethylhexane-1,6-di[2',2',6',6'-tetramethyl-piperidinyl-4')acetate]
1,2-ethylene-di[α-methyl(2',2',6',6'-tetramethyl-piperidinyl-4')acetate]
N,N'-di[α-n-butyl(2',2',6'6'-tetramethylpiperidinyl-4')acetyl]-hexane-1,6-diamine
Bis[2,2,6,6-tetramethylpiperidinyl-4)acetate]Nickel II
3,5,5-trimethyl-1-[(2',2',6',6'-tetramethylpiperidinyl-4')]-3-acetamidomethylene]cyclohexane
1,12-dodenylene-di[(2,2',6',6'-tetramethylpiperidinyl-4')acetate]

The present invention also provides a first preferred process in which a compound of formula I is produced comprising reacting compound having the formula:

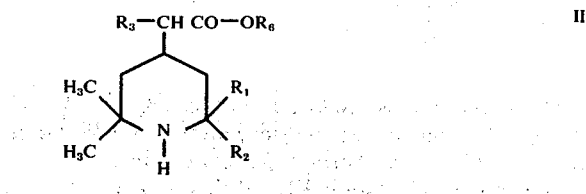

II wherein $R_1$, $R_2$ and $R_3$ have their previous significance and $R_6$ is hydrogen or an alkyl group having from 1 to 4 carbon atoms, with a compound having the formula:

III wherein $R_4$, X and n have their previous significance.

The reaction may be conveniently effected with or without the use of a catalyst and a solvent. If a catalyst is used however, it may be a lithium amide, an alkali metal alkoxide, p-toluene sulphonic acid, calcium hydroxide, tetra-butyl titanate or di-butyl tin oxide. If a solvent is used, the solvent is one which is inert to the reactants and the reaction product. Suitable solvents include xylene, toluene, cyclohexane and dioxan.

The reaction is preferably carried out at an elevated temperature, for instance at a temperature within the range of from 100° to 200° C. Advantageously, the alcohol $R_6OH$, which is produced during the reaction, is allowed to distil out of the reactor as it is formed.

If desired, the crude reaction product may be purified, for instance by solvent extraction and by subsequent re-crystallisation from a suitable solvent, or by re-distillation.

The starting-material of formula II may be produced for example by hydrogenation of a compound having the formula:

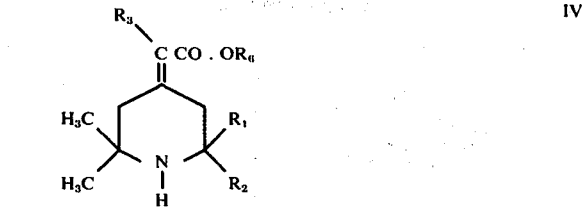

IV wherein $R_1$, $R_2$, $R_3$ and $R_6$ have their previous significance.

In a second process, a compound of formula I is produced by hydrogenating a compound having the formula:

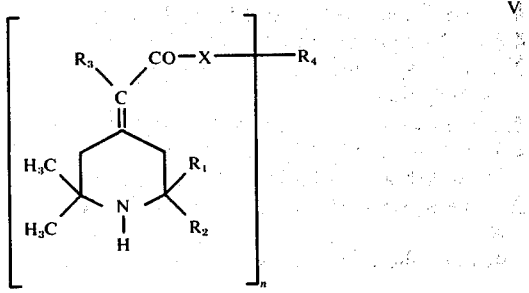

wherein $R_1$, $R_2$, $R_3$, $R_4$, X and $n$ have their previous significance.

The hydrogenation of IV and V may be conveniently effected using molecular hydrogen or using chemical means such as lithium aluminium hydride. If molecular hydrogen is used, the hydrogenation may be conducted in known manner using a hydrogenation catalyst such as palladium, platinum, rhodium, or nickel, preferably supported on a carrier such as silica, calcium carbonate or carbon. Advantageously the reaction is conducted at elevated temperature and pressure.

In a third, less preferred embodiment, a compound of formula I is produced by reacting a compound having the formula:

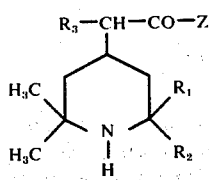

wherein $R_1$, $R_2$, and $R_3$ have their previous significance and Z is halogen, with a compound having the formula II as hereinbefore defined.

The reaction is conveniently effected in a solvent inert to the reactants and the reaction products. Suitable solvents include benzene, toluene, cyclohexane and dioxan. Advantageously the reaction is effected at an elevated temperature, preferably at the reflux temperature of the reaction mixture.

The starting-material of formula VI may be produced from the compound of formula II by methods well-known per se.

Salts of the compounds of formula I may be prepared by the reaction of the free base with an organic or inorganic acid in a suitable solvent, e.g., benzene, ether or cyclohexane.

Metal salts of the compounds of formula I may be prepared by reaction of a compound having the formula:

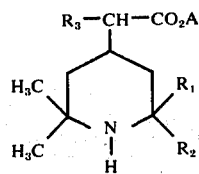

wherein $R_1$, $R_2$ and $R_3$ have their previous significance and A is an alkali metal ion, preferably sodium, with a compound having the formula:

$$M(Z)_n$$

wherein M is a metal ion, preferably a transition metal ion, especially nickel, Z is halogen and $n$ is 2, 3 or 4.

The reaction is conveniently effected in a solvent such as ethyl alcohol or water.

The present invention further provides a composition comprising an organic material, and, as stabiliser, a minor proportion of a compound of formula I as hereinbefore defined.

Compounds of formula I have been found to impart to polyolefines a high degree of stability towards deterioration normally induced by the effects of ultra-violet radiation or exposure to heat. Moreover, this improved stability is achieved without affecting the colour properties of the treated polyolefine. The stabilisers of the invention provide effective light and/or heat stabilisation especially for low- and high-density polyethylene and polypropylene and polystyrene as well as polymers of butene-1, pentene-1, 3-methylbutene-1, hexene-1, 4-methylpentene-1, 4-methylhexene-1 and 4,4-dimethylpentene-1, and also co- and ter-polymers of olefines, particularly of ethylene or propylene.

Other organic materials susceptible to degradation by the effects of light and the properties of which are improved by the incorporation therein of a compound of formula I include natural and synthetic polymeric materials, for instance natural and synthetic rubbers, the latter including, for example, homo-, co- and ter-polymers of acrylonitrile, butadiene and styrene.

Specific synthetic polymers include polyvinyl chloride and vinyl chloride co-polymers, polyvinyl acetate as well as condensation polymers derived from ether, ester (derived from carboxylic, sulphonic or carbonic acids) amide or urethane compounds; polyvinyl acetals; polyacrylates such as polymers and copolymers of methyl acrylate, ethyl acrylate, methyl methacrylate and ethyl methacrylate; polyamides; urea-formaldehyde and melamine-formaldehyde resins; cellulose plastics such as cellulose acetate, cellulose butyrate and cellulose nitrate. Certain of these polymers can, for instance, form the basis of surface coating media such as paints and lacquers having an oil or resin base, such as an alkyd or polyamide resin.

The amount of the compound of formula I which is incorporated into the organic material in order to achieve maximal protection against degradation by light varies according to the properties of the organic material treated and according to the severity of the light radiation and to the length of exposure. However, for most purposes it is sufficient to use an amount of the compound off formula I within the range of from 0.01% to 5% by weight, more preferably within the range of from 0.1% to 2% by weight based on the weight of untreated organic material.

The compounds of formula I may be incorporated into the polymeric material by any of the known techniques for compounding additives with a polymer. For example, the compound of formula I and the polymer may be compounded in an internal mixer. Alternatively, the compound of formula I may be added as a solution or slurry in a suitable solvent or dispersant, for instance an inert organic solvent such as methanol ethanol or acetone to powdered polymer and the whole mixed intimately in a mixer; and the solvent subsequently removed. As a further alternative the compound of formula I may be added to the polymer during the preparation of the latter, for instance at the latex stage of polymer production, to provide pre-stabilised polymer material.

Optionally, the composition of the invention may contain one or more further additives, especially those used in polymer formulations, such as antioxidants of the phenol or amine type, U.V. absorbers and light protectants, phosphite stabilisers, peroxide decomposers, polyamide stabilisers, basic co-stabilisers, polyvinyl chloride stabilisers, nucleation agents, plasticizers, lubricants, emulsifiers, anti-static agents, flame-protectants, pigments, carbon black, asbestos, glass-fibres, kaolin and talc.

The present invention therefore includes binary, tertiary and multi-component compositions containing, as stabiliser, a compound of formula I together with one or more functional additives for polymers.

Examples of suitable antioxidants are those of the hindered phenol type such as those selected from the following groups:

1. Phenolic compounds having the general formula

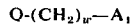

wherein
Q is

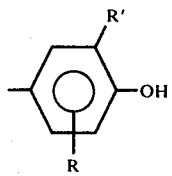

A₁ is —CR(COOR")₂

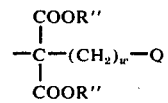

R is hydrogen or lower alkyl
R' is lower alkyl
R" is alkyl group having from 6 – 24 carbon atoms
w is an integer from 0 to 4.

Illustrative examples of the compounds shown above are:
di-n-octadecyl-α-(3,5-di-t-butyl-4-hydroxy-benzyl) malonate
di-n-octadecyl--
   -(3-t-butyl-4-hydroxy-5-methylbenzyl)malonate
di-n-oxtadecyl-α,α'bis-(3-t-butyl-4-hydroxy-5-methyl-benzyl)malonate.

2. Phenolic compounds having the general formula

Illustrative examples of the compounds shown above are:
2,6-di-t-butyl-p-cresol
2-methyl-4,6-di-t-butylphenol and the like
2,6-di-Octadecyl-p-cresol 3. Phenolic compounds having the formula

Illustrative examples of the compounds shown are:

2,2'-methylene-bis(6-t-butyl-4-methylphenol)
2,2'-methylene-bis(6-t-butyl-4-ethylphenol)
4,4'-butylidene-bis(2,6-di-t-butylphenol)
4,4'-(2-butylidene)-bis(2-t-butyl-5-methylphenol)
2,2'-methylene-bis[6-(2-t-methylcyclohexyl)-4-methylphenol]
2,2'-methylene-bis(3-t-butyl-5-ethylphenol)
4,4'-methylene-bis(3,5-di-t-butylphenol)
4,4'-methylene-bis(3-t-butyl-5-methylphenol)
2,2'-methylene-bis(3-t-butyl-5-methylphenol) and the like.

4. Phenolic compounds having the formula:

Illustrative examples of such compounds are:
2,5-di-t-butylhydroquinone
2,6-di-t-butylhydroquinone
2,5-di-t-butyl-4-hydroxyanisole 5. Phenolic compounds having the formula:

Illustrative examples of such compounds are:
4,4'-thiobis-(2-t-butyl-5-methylphenol)
4,4'-thiobis-(2-t-butyl-6-methylphenol)
2,2'-thiobis-(6-t-butyl-4-methylphenol)
4,4'-thiobis-(2-methyl-5-t-butylphenol)

6. Phenolic compounds having the formula

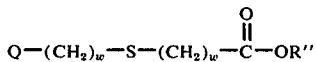

Illustrative examples of such compounds are:
octadecyl-(3,5-dimethyl-4-hydroxybenzylthio)-acetate
dodecyl-(3,5-di-t-butyl-4-hydroxybenzylthio)-propionate 7. Phenolic compounds having the formula

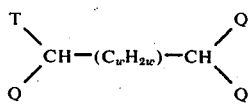

wherein T is hydrogen R or Q as defined above.

Illustrative examples of such compounds are:
1,1,3-tris(3,5-dimethyl-4-hydroxyphenyl)-propane
1,1,3-tris(5-t-butyl-4-hydroxy-2-methylphenyl)-butane
1,1,5,5-tetrakis-(3'-t-butyl-4'-hydroxy-6'-methylphenyl)-n-petane 8. Phenolic compounds having the formula:

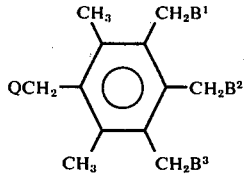

wherein B¹, B² and B³ are hydrogen, methyl or Q, provided that when B¹ and B³ are Q then B² is hydrogen or methyl and when B² is Q then B¹ and B³ are hydrogen or methyl.

Illustrative examples of such compounds are:
1,4-di(3,5-di-t-butyl-4-hydroxybenzyl)-2,3,5,6-tetramethylbenzene 1,3,5-tri(3,5-di-t-butyl-4-hydroxybenzyl)-2,4,6-trimethylbenzene 9. Phenolic compounds having the formula

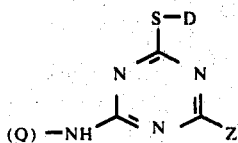

wherein Z is NHQ, —S—D— or —O—Q

D is alkyl group having from 6 – 12 carbon atoms or —($C_wH_{2w}$)—S—R''

Illustrative examples of such compounds are:
2,4-bis-(n-octylthio)-6-(3,5-di-t-butyl-4-hydroxyaniline)-1,3,5-triazine
6-(4-hydroxy-3-methyl-5-t-butylanilino)-2,4-bis-(n-octylthio)-1,3,5-triazine
6-(4-hydroxy-3,5-dimethylanilino)-2,4-bis-(n-octylthio)-1,3,5-triazine
6-(4-hydroxy-3,5-di-t-butylanilino)-2,4-bis-(n-octylthio)-1,3,5-triazine
6-(4-hydroxy-3,5-di-t-butylanilino)-4-(4-hydroxy-3,5-di-t-butylphenoxy)-2-(n-octylthio)1,3,5-triazine
2,4-bis(4-hydroxy-3,5-di-t-butylanilino)-6-(n-octylthio)1,3,5-triazine 10. Phenolic compounds having the formula:

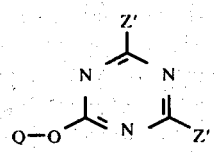

wherein Z' is —O—Q, —S—D or —S—($C_wH_{2w}$)—SD.

Illustrative examples of such compounds are:
2,3-bis-(3,5-di-t-butyl-4-hydroxyphenoxy)-6-(n-octylthio)-1,3,5-triazine
2,4,6-tris-(4-hydroxy-3,5-di-t-butylphenoxy)-1,3,5-triazine
6-(4-hydroxy-3,5-di-t-butylphenoxy)-2,4-bis-(n-octylthioethylthio)-1,3,5-triazine
6-(4-hydroxy-3-methylphenoxy)-2,4-bis-(n-octylthio)-1,3,5-triazine
6-(4-hydroxy-3-t-butylphenoxy)-2,4-bis-(n-octylthioethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine
6-(4-hydroxy-3,5-di-t-butylphenoxy)-2,4-bis-(n-octylthiopropylthio)-1,3,5-triazine
6-(4-hydroxy-3,5-di-t-butylphenoxy)-2,4-bis-(n-dodecylthioethylthio)-1,3,5-triazine
2,4-bis-(4-hydroxy-3,5-di-t-butylphenoxy)-6-butylthio 1,3,5-triazine
2,4-bis-(4-hydroxy-3,5-di-t-butylphenoxy)-6-(n-octadecylthio)-1,3,5-triazine
2,4-bis-(4-hydroxy-3,5-di-t-butylphenoxy)-6-(n-dodecylthio)-1,3,5-triazine
2,4-bis-(4-hydroxy-3,5-di-t-butylphenoxy)-6-(n-octylthiopropylthio)-1,3,5-triazine
2,4-bis-(4-hydroxy-3,5-di-t-butylphenoxy)-6-(n-octylthioethylthio)-1,3,5-triazine
2,4-bis-(4-hydroxy-3,5-di-t-butylphenoxy)-6-(n-dodecylthioethylthio)-1,3,5-triazine.

11. Phenolic compounds having the formula

wherein $p$ is an integer from 2 to 4 and R''' is a tetravalent radical selected from aliphatic hydrocarbons having from 1 to 30 carbon atoms, aliphatic mono- and dithioethers having from 1 to 30 carbon atoms, aliphatic mono- and diethers having from 1 to 30 carbon atoms and $z$ is an integer from 0 to 6.

Illustrative examples of such compounds are:

Sub-class I n-Octadecyl-3-(3,5-di-t-butyl-4-hydroxyphenyl)-propionate
n-Octadecyl-2-(3,5-di-t-butyl-4-hydroxyphenyl)-acetate
n-Octadecyl-3,5-di-t-butyl-4-hydroxybenzoate
n-Hexyl-3,5-di-t-butyl-4-hydroxyphenylbenzoate
n-Dodecyl-3,5-di-t-butyl-4-hydroxyphenylbenzoate
Neo-dodecyl-3-(3,5-di-t-butyl-4-hydroxyphenyl)-propionate
Dodecyl-$\beta$-(3,5-di-t-butyl-4-hydroxyphenyl)-propionate
Ethyl-$\alpha$-(4-hydroxy-3,5-di-t-butylphenyl)-isobutyrate
Octadecyl-$\alpha$-(4-hydroxy-3,5-di-t-butylphenyl)-isobutyrate
Octadecyl-$\alpha$-(4-hydroxy-3,5-di-t-butylphenyl)-propionate

Sub-class II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-hydroxyphenylacetate
2-(n-octadecylthio)ethyl 3,5-di-t-butyl-4-hydroxybenzoate
2-(2-hydroxyethylthio)ethyl 3,5-di-t-butyl-4-hydroxybenzoate
2, 2'-Thiodiethanol bis(3,5-di-t-butyl-4-hydroxyphenyl) acetate
Diethyl glycol bis-[3,5-di-t-butyl-4-hydroxyphenyl) propionate]
2-(n-octadecylthio)ethyl 3-(3,5-di-t-butyl-4-hydroxyphenyl)propionate
2, 2'-Thiodiethanol-bis-3-(3,5-di-t-butyl-4-hydroxyphenyl)propionate
Stearamido N,N-bis-[ethylene 3-(3,5-di-t-butyl-4-hydroxyphenyl)propionate]
n-Butylimino N,N-bis-[ethylene 3-(3,5-di-t-butyl-4-hydroxyphenyl)propionate]
2-(2-stearoyloxyethylthio)ethyl 3,5-di-t-butyl-4-hydroxybenzoate
2-(2-hydroxyethylthio)ethyl 7-(3-methyl-5-t-butyl-4-hydroxyphenyl)heptanoate
2-(2-stearoyloxyethylthio)ethyl 7-(3-methyl-5-t-butyl-4-hydroxyphenyl)heptanoate

Sub-class III 1,2-propylene glycol bis-[3-(3,5-di-t-butyl-4-hydroxyphenyl)propionate]
Ethylene glycol bis-[3-(3,5-di-t-butyl-4-hydroxyphenyl) propionate]
Neopentylglycol bis-[3-(3,5-di-t-butyl-4-hydroxyphenyl) propionate]

Ethylene glycol bis-(3,5-di-t-butyl-4-hydroxyphenyl-acetate)
Glycerine-1-n-octadecanoate-2,3-bis-(3,5-di-t-butyl-4-hydroxyphenylacetate
Pentaethylthritol-tetrakis-[3-(3,5-di-t-butyl-4-hydroxyphenyl)propionate]
1, 1, 1-trimethylol ethane-tris-3-(3,5-di-t-butyl-4-hydroxyphenyl)propionate
Sorbitol hexa-[3-(3,5-di-t-butyl-4-hydroxyphenyl) propionate]
1, 2, 3-butanetriol tris-[3-(3,5-di-t-butyl-4-hydroxyphenyl)propionate]
2-hydroxyethyl 7-(3-methyl-5-t-butyl-4-hydroxyphenyl) heptanoate
2-stearoyloxyethyl 7-(3-methyl-5-t-butyl-4-hydroxyphenyl)heptanoate
1, 6-n-hexanediol-bis[3',5'-di-tbutyl-4-hydroxyphenyl) propionate]

12. Phenolic compounds having the formula

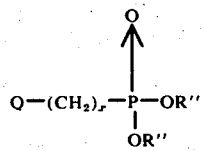

where $x$ is an integer of 1 or 2.

Illustrative examples of such compounds are
Di-n-octadecyl 3, 5-di-t-butyl-4-hydroxybenzyl-phosphonate
Di-n-octadecyl 3-t-butyl-4-hydroxy-5-methylbenzyl-phosphonate
Di-n-octadecyl 1-(3,5-di-t-butyl-4-hydroxyphenyl)-ethanephosphonate
Di-n-tetradecyl 3, 5-di-t-butyl-4-hydroxybenzyl-phosphonate
Di-n-hexydecyl 3, 5-di-t-butyl-4-hydroxybenzyl-phosphonate
Di-n-docosyl-3, 5-di-t-butyl-4-hydroxybenzyl-phosphonate
Di-n-octadecyl 3, 5-di-t-butyl-4-hydroxybenzyl-phosphonate.

13. Phenolic compounds having the formula

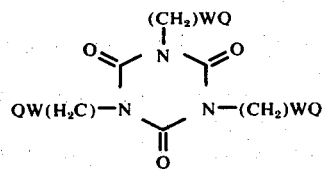

wherein W and Q are defined above. Illustrative examples of such compounds are:
tris-(3, 5-di-t-butyl-4-hydroxybenzyl)isocyanurate
tris-(3-t-butyl-4-hydroxy-5-methylbenzyl)isocyanurate.

While any of the above mentioned antioxidants can be useful in combination with the ultraviolet light stabilizers of this invention, the preferred antioxidants consist of the hindered phenols in groups 1, 8, 9, 10, 11, 12 and 13 as mentioned above. The most preferred hindered phenols are those of groups 1, 9, 11, 12 and 13.

Further examples of antioxidants are those of the aminoaryl series for instance aniline and naphthylamine derivatives as well as their heterocyclic derivatives such as:
phenyl-1-naphthylamine
phenyl-2-naphthylamine
N,N'-diphenyl-p-phenyldiamine
N,N'-di-sec.butyl-p-phenylenediamine
6-Ethoxy-2, 2, 4-trimethyl-1, 2-dihydroquinoline
6-Dodecyl-2, 2, 4-trimethyl-1, 2-dihydroquinoline
Mono- and di-octyliminodibenzyl and
polymerised 2, 2, 4-trimethyl-1, 2-dihydroquinoline.

Ultraviolet absorbers and light protectants include
a. 2-(2'-hydroxyphenyl)benzotriazoles, for instance 5'-methyl; 3',5'-di-t-butyl; 5'-t-butyl; 5-chloro-3', 5'-di-t-butyl; 5-chloro-3'-t-butyl-5'-methyl; 3'-sec. butyl-5'-tert.butyl; 3'-[α-methylbenzyl]-5'-methyl-; 3'-[α-methylbenzyl]-5'-methyl-5-chloro-; 4'-octoxy-; 3',5'-di-t-amyl; 3'-methyl-5'-carbamethoxyethyl; 5-chloro-3',5'-di-t-amyl derivatives.

b. 2,4-bis-(2'-hydroxyphenyl)-6-alkyl-S-triazines, for instance the 6-ethyl or 6-undecyl derivatives.

c. 2-hydroxybenzophenones, for instance the 4-hydroxy, 4-methoxy, 4-octoxy-, 4-decyloxy-, 4-dodecyloxy-, 4, 2', 4'-trihydroxy or 2'-hydroxy-4, 4'-dimethoxy derivatives.

d. 1,3-Bis(2'-hydroxybenzoyl)-benzenes for instance,
1,3-bis-(2'-hydroxy-4'-hexyloxybenzoyl)benzene
1,3-bis-(2'-hydroxy-4'-octoxybenzoyl)benzene
1,3-bis-(2'-hydroxy-4'-dodecyloxybenzoyl)benzene e. Aryl esters from optionally substituted benzoic acids such as phenylsalicylate, octylphenylsalicylate, dibenzoyl resorcinol, bis-(4-tert.butylbenzoyl) resorcinol, benzoyl-resorcinol and 3,5-di-tert.butyl-4-hydroxy-benzoic acid-2,4-di-tert.butyl phenyl ester and -octadecyl ester and -2-methyl-4,6-di-tert.butyl phenyl ester.

f. Acrylates, for instance
α-Cyano-β,β-diphenylacrylic acid ethyl- or iso-octyl ester, α-carbomethoxy cinnamic acid, methyl- or butyl ester and N-(β-carbomethoxy-vinyl)-2-methyl indoline.

g. Nickel compounds such as nickel complexes of 2,2'-thio-bis-(4-tert.octylphenol), for instance the 1:1 and 1:2 complexes, optionally having other ligands such as n-butylamine, triethanolamine or N-cyclohexyl-diethanol-amine; nickel complexes of bis-(4-tert.octylphenyl) sulphone such as the 2:1 complex, optionally having other ligands such as 2-ethylcaproic acid; nickel dibutyl dithiocarbamates; nickel salts of 4-hydroxy-3,5-di-tert. butylbenzyl-phosphonic acid mono-alkyl esters such as the methyl-, ethyl- or butyl esters; the nickel complex of 2-hydroxy-4-methyl-phenyl-undecylketonoxime; and nickel-3,5-di-tert.butyl-4-hydroxy benzoate, and h. Oxalic acid diamides, for instance
4,4'-dioctyloxyoxanilide
2,2'-dioctyloxy-5,5'-di-tert.butyl-oxanilide
2,2'-di-dodecyloxy-5,5'-di-tert.butyl oxanilide
2-ethoxy-5-tertiarybutyl-2'-ethyl-oxanilide
2-ethoxy-2'-ethyl-oxanilide
mixtures of o- and p-methoxy and ethoxy-di-substituted oxanilides and the compound of formula:

Phosphite stabilisers include triphenyl phosphite, diphenylalkyl phosphites, phenyl dialkyl phosphites, trinonylphenyl phosphite, trilauryl phosphite; trioctadecyl phosphite, 3,9-di-isodecyloxy-2, 4, 8, 10-tetraoxa-3,9-diphosphaspiro-(5,5)-undecane and tri-(4-hydroxy-3,5-di-tert.butylphenyl)phosphite.

Peroxide-decomposing compounds for polyolefins include esters, of β-thiodipropionic acids, for instance the lauryl-, stearyl-, myristyl- or tridecyl esters, salts of mercapto-benzimidazoles such as the zinc salt and diphenylthiourea.

Suitable polyamide stabilisers include copper salts in combination with iodides and/or further phosphorus compounds and salts of bivalent manganese.

Basic co-stabilisers are, for example, polyvinylpyrrolidone, melamine, benzoguanamine, triallyl cyanurate, di-cyandiamide, urea derivatives, hydrazine derivatives, amines, polyamides, polyurethanes, alkali and alkaline earth salts of higher saturated or unsaturated fatty acids such as calcium stearate.

Polyvinyl chloride stabilisers include organotin compounds, organo lead compounds and Ba/Cd salts of fatty acids.

Examples of nucleation agents are 4-tert.butyl benzoic acid, adipic acid and diphenylacetic acid.

As with the compound of formula I, and further additive is advantageously employed in a proportion within the range of from 0.01% by weight, based on the weight of untreated organic materials.

Some Examples will now be given. Parts and percentages shown therein are by weight unless otherwise stated.

EXAMPLE 1

18.2 Parts by weight of ethyl (2,2,6,6-tetramethyl-piperidinyl-4) acetate, 2.7 parts by weight of butane-1,4-diol and 1 part by weight of lithium amide, were heated at 160° C/760 mmHg for 30 minutes and then at 160° C/12 mmHg for a further 5 minutes. The resulting mass was cooled and treated with 200 parts by volume of water — the resulting crystalline solid was filtered, dissolved in 30 parts by 100 parts volume of water. The solid was collected by filtration and dried at 60° C/12 mmHg to give butylene-4-di[(2',2',6',6'-tetramethyl-piperidinyl-4')-acetate ] melting at 30° C. and having the following elemental analysis by weight:

|  | C | H | N |
|---|---|---|---|
| Found | 68.73 | 10.57 | 6.23% |
| Calculated for $C_{49}H_{88}N_4O_8$ | 68.37 | 10.23 | 6.50% |

EXAMPLE 2

17.2 Parts by weight of ethyl(2,2,6,6-tetramethyl-piperidinyl-4) acetate, 1.4 parts by weight of pentaerythritol, and 1 part by weight of lithium amide were heated together with stirring at 160° C/760 mmHg for 1 hour, then at 160° C/12 mmHg for a further 1 hour. The resulting mass was cooled to room temperature, and poured into 100 parts by volume of water, this was then extracted with 4 ×50 parts by volume of ether. The combined ether extracts were dried over magnesium sulphate and the ether removed by distillation. The residual oil was dissolved in petroleum ether (boiling range 60°–80° C.), decolourised with active carbon, and the petroleum ether was removed by distillation at 100° C/12 mmHg, to give tetrakis [(2,2,6,6-tetramethylpiperidinyl-4)acetoxymethyl]methane, $n_D^{28°}$ 1.4653 having the following elemental analysis by weight:

|  | C | H | N |
|---|---|---|---|
| Found | 68.10 | 10.23 | 6.79% |
| Calculated for $C_{49}H_{88}N_4O_8$ | 68.37 | 10.23 | 6.50% |

EXAMPLE 3

18.2 Parts by weight of ethyl(2,2,6,6-tetramethyl-piperidinyl-4) acetate, 3.5 parts by weight of 1,6-diamino hexane, and 3.6 parts by weight of sodium methoxide were heated at 160° C/760 mmHg for 2 hours. The resulting mass was cooled and triturated with 100 parts by volume of petroleum ether (boiling range 60°–80° C.) to give a white solid, this was collected by filtration, placed in a soxhlet extraction funnel and continuously extracted with ethyl acetate (100 parts by volume). By filtration of the cooled ethyl acetate a white solid was obtained of pure N,N'-di [(2',2',-6',6'-tetramethylpiperidinyl-4)-acetyl]hexane-1,6-diamine (containing 1 molecule of ethylacetate entrained in the crystals) melting at 103° C. and having the following elemental analysis by weight:

|  | C | H | N |
|---|---|---|---|
| Found | 68.12 | 10.90 | 9.67% |
| Calculated for $C_{32}H_{62}N_4O_4$ | 67.80 | 11.02 | 9.88% |

EXAMPLES 4 to 8

38 parts of polypropylene were homogenised with 0.076 parts of n-octadecyl-3-(4'-hydroxy-3',5'-t-butyl-phenyl) propionate in a kneading machine over a period of 3 minutes. 0.19 parts of the product of Example 1 was then added and homogenisation continued for another 7 minutes.

The homogenised mixture was removed from the kneader and pressed to a thickness of from 2 to 3 mm. in a press.

9 parts of the polypropylene mixture were then charged into a second press in which the press-plates were protected by aluminium foil having a thickness of 0.1 mm. The press was closed and, for 2 minutes, no pressure was applied. The pressure was then increased up to a maximum of 12 tons and this pressure held for 6 minutes, the temperature of the press being 260° C. The pressure was released and the material (0.3 mm thick) was cooled under running water.

This material was cut into from 3 to 5 pieces of 35 ×35 mm section and re-charged to the press. The press was closed and no pressure was applied for 2 minutes. Over another 2 minutes the pressure was increased to 8 ton, the press temperature being 260° C. This pressure was maintained for 2 minutes and then the pressure released. The polypropylene foil of 0.1 mm thickness was removed and tempered immediately in a circulating air over maintained at 150° C over a period of 60 minutes.

A section measuring 44 ×100 mm was separated from the 0.1 mm tempered polypropylene foil and exposed to light irradiation in a fademeter device consisting of a circular bank of 28 alternating sunlight and blacklight lamps. The sunlight lamps were 2 feet long, 20-watt fluorescent lamps characterised by a peak emission of 3100 Angstrom units; the blacklight lamps were 2 feet long, 20 watt ultraviolet lamps characterized by a peak emission of 3500 Angstrom units. The sample was rotated concentrically about the bank of lamps so that the radiation therefrom was uniformly distributed over the section under test.

The exposed sample was examined periodically, when portions of it were removed for tenicle testing and the time (T) required for the elongation of the sample to decrease to 50% of the initial elongation was determined.

The time (Tc) required for the elongation of a control sample (not containing the product of Example 1) to decrease to 50% of the initial elongation was then determined.

The performance of the compound of Example 1 as a light stabiliser could then be assessed by determining the factor T/Tc.

The results obtained including the use of other compounds of the invention as stabilisers are set out in the following Table:

TABLE

| Example | Additive Control | Factor T (for compound) Tc (for control) 1 |
|---|---|---|
| 4 | Butylene-1,4-di[(2',2',6',6'-tetramethyl-piperidinyl-4')acetate] | >5.0 (6.9) |
| 5 | Tetrakis (2,2,6,6-tetramethyl piperidinyl-4) acetoxymethyl methane | 7.8 |
| 6 | N,N'-Bis(2,2,6,6-tetramethyl piperidinyl-4 acetyl) Hexane 1,6-diamine | 6.4 |
| 7 | Ethane-1,2-di[(2',2',6',6'-tetra-methylpiperidinyl-4') acetate | 5.4 |
| 8 | Di[2',2',6',6'-tetramethyl piperidinyl-4') acetyl] ethane-1, 2-diamine | 5.0 |

EXAMPLE 9

27.2 Parts by weight of ethyl(2,2,6,6-tetramethylpiperidinyl-4) acetate, 3.0 parts of 1,2-diaminoethane, and 5.4 parts by weight of sodium methoxide were heated at 100° C. with stirring for 30 minutes, at 160° C. for 20 minutes and finally at 160° C/12 mm.Hg for 10 minutes; during this final period, ethyl alcohol produced was allowed to distil from the reaction flask. The product was cooled, triturated with water and purified by continuous extraction with refluxing cyclohexane.

N,N'-di[2,',2',6',6'-tetramethylpiperidinyl-4) acetyl] ethane-1,2-diamine was obtained having a melting point of 171° C. and having the following elemental analysis by weight:

| | C | H | N |
|---|---|---|---|
| Found | 68.05 | 10.76 | 13.13 |
| Required for $C_{24}H_{46}N_4O_2$ | 68.20 | 10.97 | 13.26 |

EXAMPLE 10

A mixture of 34 parts by weight of ethyl (2,2,6,6-tetramethylpiperidinyl-4) acetate, 3.1 parts by weight of ethanediol and 1 part by weight of lithium amide was heated with stirring from room temperature to 160° C. over a period of 1 hour. The temperature was maintained at 160° C. for a further 30 minutes — during which time ethyl alcohol was allowed to distil from the reaction flask.

The resulting mixture was cooled to room temperature and poured into 100 parts by volume of water, the water was extracted with diethyl ether (4 ×50 parts by volume). The combined ether extracts were dried over magnesium sulphate and the ether was removed by evaporation to give a colourless oil which was purified by distillation to give 1,2-ethylenedi[(2,2,6,6-tetramethylpiperidinyl-4) acetate] boiling at 188°–90° /0.3 mm. and having the following elemental analysis by weight:

| | C | H | N |
|---|---|---|---|
| Found | 68.27 | 10.31 | 6.69% |
| Required for $C_{24}H_{44}N_2O_4$ | 67.89 | 10.44 | 6.60% |

EXAMPLE 11

A mixture of 13.8 parts by weight of ethyl (2,2,6,6-tetramethylpiperidinyl-4) acetate, 2.6 parts by weight of 2-butene-4-diol and 0.5 part by weight of lithium amide was heated at 160° C. for 1 hour. Ethyl alcohol, produced during the reaction, was allowed to distil from the reaction flask during this time. The suspension was then cooled and poured into 100 parts by volume of water, the product was extracted with ether, the combined ether extracts were dried over magnesium sulphate and the ether removed by evaporation. Distillation of the residue gave pure, 1,4-but-2-en-di[(2',2',6',6'-tetramethylpiperidinyl-4')acetate], boiling at 210° C./0.2m.m. and having the following elemental analysis by weight:

| | C | H | N |
|---|---|---|---|
| Found | 69.10 | 10.28 | 6.44% |
| Required for $C_{26}H_{46}N_2O_4$ | 69.29 | 10.29 | 6.22% |

EXAMPLE 12

A mixture of 22.7 parts by weight of ehtyl (2,2,6,6-tetramethylpiperidinyl-4) acetate, 8.1 parts by weight of dodecane diol and 0.5 part by weight of lithium amide was reacted as in Example 11, to give 1,12-dodecane di[(2',2',6',6'-tetramethylpiperidinyl-4')

acetate], boiling at 260°–262° C./0.6 m.m and having the following elemental analysis by weight:

|                                  | C     | H     | N     |
|----------------------------------|-------|-------|-------|
| Found                            | 72.03 | 11.31 | 4.72% |
| Required for $C_{34}H_{64}N_2O_4$ | 72.29 | 11.42 | 4.96% |

EXAMPLE 13

A mixture of 18.2 parts by weight of ethyl (2,2,6,6-tetramethylpiperidinyl-4) acetate, 4.2 parts by weight of diethyleneglycol and 0.5 part by weight of lithium amide was treated as in Example 11 to give 3'-oxa-1',-5'-pentylene di [(2,2,6,6-tetramethylpiperidinyl-4)acetate], boiling at 206°–208° C./0.3 m.m and having the folliwng elemental analysis by weight:

|                                 | C     | H     | N     |
|---------------------------------|-------|-------|-------|
| Found                           | 66.60 | 10.53 | 5.68% |
| Required for $C_{26}H_{48}N_2O_5$ | 66.63 | 10.32 | 5.98% |

EXAMPLE 14

A solution of 2.4 parts by weight of nickel chloride hexahydrate in 40 parts by volume of methyl alcohol was added to a stirred solution of 4.4 parts by weight of sodium [(2,2,6,6-tetramethylpiperidinyl-4)acetate] (prepared by the hydrolysis of ethyl [2,2,6,6-tetramethylpiperidinyl] acetate in dilute sodium hydroxide) in 80 parts by volume of methyl alcohol at reflux temperature. The solution was heated at reflux for a further 4 hours, then cooled and the insoluble removed by filtration. Methyl alcohol was removed by distillation under reduced pressure and the green solid residue was extracted with 100 parts by volume of chloroform. A small amount of insoluble material was removed by filtration and the solution was then evaporated to dryness to give a green solid nickel salt, having the following elemental analysis by weight:

Carbon: 44.05 %
Hydrogen: 7.44 %
Nitrogen: 4.80 %
Nickel: 16.55 %

I claim:

1. A composition of matter stabilized against ultraviolet and heat deterioration which comprises a synthetic organic polymer normally subject to deterioration containing from 0.1% to 2% by weight of the polymer of a stabilizing compound of the formula

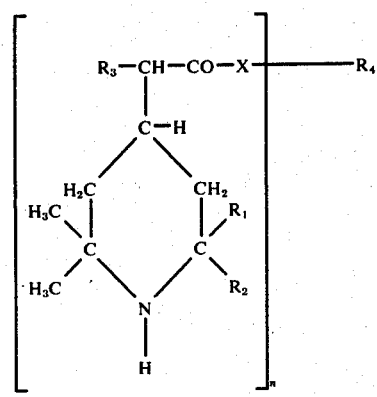

wherein
$R_1$ to $R_2$ are the same or different and each is a straight or branched alkyl residue having from 1 to 12 carbon atoms or $R_1$ and $R_2$, together with the carbon atom to which they are attached, form a cycloalkyl group having from 5 to 12 carbon atoms,
$R_3$ is hydrogen, a straight-or branched alkyl residue having from 1 to 4 carbon atoms, an aralkyl residue having from 7 to 9 carbon atoms, or a cycloalkyl group having 5 or 6 carbon atoms,
$R_4$ is an ion of a metal of Group 8 of the Periodic System of Elements or a hydrocarbyl residue having from 2 to 20 carbon atoms and being either unsubstituted or substituted by halogen or interrupted by one or more oxygen or sulphur atoms,
X is —O—, —S— or >$NR_5$ wherein $R_5$ has the same significance as $R_3$ and
n is 2, 3 or 4.
2. A composition according to claim 1 wherein the polymer is a polyolefin.
3. A composition according to claim 1 wherein $R_1$ and $R_2$ are each methyl.
4. A composition according to claim 3 wherein $R_3$ and $R_5$ are each hydrogen.
5. A composition according to claim 4 wherein n is 2 and $R_4$ is a divalent straight- or branched aliphatic residue either saturated or unsaturated having from 2 to 20 carbon atoms, a divalent alicyclic residue having from 5 to 20 carbon atoms, a divalent aralkyl residue having from 8 to 20 carbon atoms or a divalent aryl residue having from 6 to 20 carbon atoms.
6. A composition according to claim 4 wherein n is 3 and $R_3$ is a trivalent straight- or branched aliphatic residue, either saturated or unsaturated, having 3 to 15 carbon atoms, a trivalent alicyclic residue having from 5 to 15 carbon atoms, a trivalent aralkyl residue having from 9 to 15 carbon atoms or a trivalent aryl residue having from 6 to 16 carbon atoms.
7. A composition according to claim 4 wherein n is 4 and $R_4$ is a tetravalent straight- or branched aliphatic residue, either saturated or unsaturated, having from 4 to 12 carbon atoms or a tetravalent alicyclic residue having from 5 to 12 carbon atoms.
8. A composition according to claim 1 wherein $R_4$ is nickel.
9. A composition according to claim 2 wherein the stabilizer is 1,4-butylene-di-[(2',2',6',6'-tetramethylpiperidinyl-4'-acetate].
10. A composition according to claim 2 wherein the stabilizer is tetrakis-[(2,2,6,6-tetramethyl-piperidinly-4)-acetoxymethyl]-methane.
11. A composition according to claim 2 wherein the stabilizer is N,N'-bis-[(2',2',6',6'-tetramethyl-piperdinyl-4)-acetyl]-hexane-1,6-diamine.
12. A composition according to claim 2 wherein the stabilizer is 1,2-ethylene-di-[(2',2',6',6'-tetramethylpiperidinyl-4')-acetate].
13. A composition according to claim 2 wherein the stabilizer is N,N'-bis-[(2',2',6',6'-tetramethyl-piperidinyl-4')-acetyl]-ethane-1,2-diamine.

* * * * *